(12) United States Patent
Wang et al.

(10) Patent No.: US 12,095,295 B1
(45) Date of Patent: Sep. 17, 2024

(54) CHARGING MODULE, WIRE ORGANIZER, AND POWER SUPPLY BODY

(71) Applicant: Shenzhen USAMS Technology Co., Ltd, Shenzhen (CN)

(72) Inventors: Haijun Wang, Huizhou (CN); Zhensheng Chen, Shenzhen (CN)

(73) Assignee: SHENZHEN USAMS TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/435,978

(22) Filed: Feb. 7, 2024

(30) Foreign Application Priority Data

May 11, 2023 (CN) .......................... 202321141589.8

(51) Int. Cl.
*H02J 7/00* (2006.01)
(52) U.S. Cl.
CPC .................................. *H02J 7/0042* (2013.01)
(58) Field of Classification Search
CPC ............................... H02J 7/0042; H02G 11/02
See application file for complete search history.

(56) References Cited

U.S. PATENT DOCUMENTS

2022/0271545 A1* 8/2022 Cheng ................. H01R 31/065

FOREIGN PATENT DOCUMENTS

| CN | 203522258 U | 4/2014 |
| CN | 212114824 U | 12/2020 |

* cited by examiner

*Primary Examiner* — Robert Grant
(74) *Attorney, Agent, or Firm* — Andrew C. Cheng (57) ABSTRACT

The present invention relates to the technical field of charging devices, in particular to a charging module, a wire organizer and a power supply body. The charging module includes the power supply body and the wire organizer which are detachably connected; the wire organizer is provided with a first connecting component, the power supply body is provided with an adaptive second connecting component, and the wire organizer is detachably connected with the power supply body through the first connecting component and the second connecting component; and the wire organizer is provided with a first electrical connecting structure, the power supply body is provided with a second electrical connecting structure, and when the first electrical connecting structure is connected with the second electrical connecting structure, the wire organizer is electrically connected with the power supply body.

18 Claims, 8 Drawing Sheets

CHARGING MODULE, WIRE ORGANIZER, AND POWER SUPPLY BODY

PRIOR ART

The present invention relates to the technical field of charging devices, in particular to a charging module, a wire organizer and a power supply body.

BACKGROUND OF THE INVENTION

With the rapid development of science and technology in recent years, electronic devices have become one of the indispensable devices in modern life. For example, people usually carry mobile phones, tablets, cameras and other electronic devices in trips. The use of these electronic devices relies on sufficient power. At present, although a large number of wireless charging electronic devices have appeared, a wired charging mode is still the first choice of most people.

In the wired charging mode, people usually face the problem that charging cables are not easy to store, especially in outdoor activities, charging interfaces required for different electronic devices are different, resulting in that the carried multiple charging cables are mess, not easy to store, and knot. Although there are devices that can coil the charging cables in the prior art, these wire reels have poor flexibility, and are usually used alone or integrated with power supply bodies of functional products, such as a portable charger. The types of charging cables in the functional products are usually fixed and cannot be replaced, reducing the versatility of the functional products. As existing electronic devices require different charging powers, functional products that are not universal will cause trouble for users. For example, for fast-charging electronic devices, when charging cables are incompatible with the protocol of the electronic devices to be charged, a fast-charging effect cannot be triggered, which greatly reduces the user's experience effect on charging.

Therefore, it is necessary to provide a wire organizer with both storage function and flexibility and related functional products to optimize the charging experience and improve the versatility.

SUMMARY OF THE INVENTION

In order to solve the above problems existing in the prior art, the present invention provides a charging module, a wire organizer and a power supply body. The wire organizer has both storage and flexibility functions, capable of being flexibly connected with power supply bodies, such as an adapter body and a portable power source body, which increases the versatility of functional products, increases usage occasions of the wire organizer, optimizes the charging experience of users, and is convenient to carry.

In order to solve the above technical problems, the present invention provides the following technical solution: a charging module, including a power supply body and a wire organizer, and the power supply body is detachably connected with the wire organizer;

the wire organizer is provided with a first connecting component, the power supply body is provided with an adaptive second connecting component, and the wire organizer is detachably connected with the power supply body through the first connecting component and the second connecting component; and the wire organizer is provided with a first electrical connecting structure, the power supply body is provided with a second electrical connecting structure, and when the first electrical connecting structure is connected with the second electrical connecting structure, the wire organizer is electrically connected with the power supply body.

Preferably, the first connecting component includes a first fixing portion and a first magnet component, the second connecting component includes a second fixing portion and a second magnet component, the first fixing portion is adaptive to the second fixing portion, and the first magnet component is adaptive to the second magnet component.

Preferably, the first fixing portion includes a convex plate and/or a groove; the second fixing portion includes a groove and/or a convex plate adaptive to the first fixing portion; and the first fixing portion and the first electrical connecting structure are arranged on the same outer wall face of the wire organizer, and the second fixing portion and the second electrical connecting structure are arranged on the same outer wall face of the power supply body.

Preferably, one of the first electrical connecting structure and the second first electrical connecting structure is a conductive female seat, and the other is an adaptive conductive male seat.

Preferably, the first electrical connecting structure includes a first contact portion, the first contact portion includes a first contact terminal set, the second electrical connecting structure includes a second contact portion, and the second contact portion includes a second contact terminal set.

Preferably, the first contact portion further includes a first limiting structure arranged around the first contact terminal set, the second contact portion further includes a second limiting structure arranged around the second contact terminal set, and the first limiting structure is adaptive to the second limiting structure.

Preferably, the first contact terminal set and the second contact terminal set each includes a signal terminal, a positive terminal and a negative terminal, and the signal terminal includes a fast-charging recognition terminal.

Preferably, the wire organizer includes a first shell component, and a storage component and a wire mounted in the first shell component, the storage component is rotatably arranged, one end of a wire is wound on the storage component and electrically connected with the first electrical connecting structure, and the other end of the wire penetrates through the first shell component to be exposed.

Preferably, the wire organizer further includes a first circuit board, the storage component is arranged on a top face of the first circuit board, the wire wound on the storage component is electrically connected with the first circuit board, the first electrical connecting structure is arranged on a bottom face of the first circuit board, and the first electrical connecting structure is electrically connected with the first circuit board.

Preferably, the exposed end of the wire is a charging end, and the charging end is detachably fixed to an outer side of the first shell component.

Preferably, the first shell component is provided with a fixing groove, an outer wall face or an inner wall face of the first shell component is provided with a fixing piece corresponding to the fixing groove, and the charging end is detachably fixed to the fixing groove through the fixing piece.

Preferably, the storage component includes a storage seat set, and a third magnet component, a rotating shaft piece, a gear and a pick connected with the storage seat set; and the third magnet component includes a second magnet sheet and a third magnet sheet mutually magnetized, the second magnet sheet is fixedly connected to the first shell component, and the third magnet sheet is connected to one end of the pick; the other end of the pick is provided with a first clamping piece, a second clamping piece and a third clamping piece; the rotating shaft piece is provided with a rotating shaft clamping groove, and the third clamping piece protrudes towards the rotating shaft piece; the gear is movably connected with the pick, the gear includes a plurality of first clamping grooves and second clamping grooves arranged at intervals, and the first clamping grooves are provided with first steps; and the pick rotates under driving of the rotating shaft piece, and drives the gear to rotate through the first clamping piece or the second clamping piece.

Preferably, the charging end is provided with at least one charging interface, and the charging interface is one or more of a USB interface, a Type-C interface, and a Lighting interface.

Preferably, the power supply body is one of an adapter body, a portable power source body, or a car charger body.

Preferably, the power supply body further includes an input terminal, the power supply body is further internally provided with a power source adapting piece, the power supply body is further provided with a charging interface, the input terminal, the charging interface and the second electrical connecting structure are electrically connected with the power source adapting piece respectively, and the first electrical connecting structure is electrically connected with the power source adapting piece through the second electrical connecting structure.

Preferably, the power source adapting piece includes a second circuit board and a third circuit board, and the second circuit board is perpendicular to the third circuit board; and the second circuit board is electrically connected with the third circuit board, the input terminal is arranged on the second circuit board, and the charging interface and the second electrical connecting structure are arranged on the third circuit board.

Preferably, the fixing groove and the charging interface on the power supply body are located on the same outer side face of the charging module.

Preferably, when only the charging end is connected with an external device for charging work, the charging end supplies power with a first power;

when only the charging interface on the power supply body is connected with the external device for charging work, the charging interface on the power supply body supplies power with a second power;

when the charging end and the charging interface on the power supply body are simultaneously connected with the external device for charging work, the charging end and the charging interface on the power supply body supply power with a third power; and the first power and the second power are both greater than the third power.

In order to solve the above technical problems, the present invention provides another technical solution as follows: a wire organizer, the wire organizer is provided with a first connecting component and a first electrical connecting structure, the first connecting component is configured to achieve a detachable structure connection with an outer power supply body, and the first electrical connecting structure is configured to being electrically connected with the outer power supply body.

In order to solve the above technical problems, the present invention provides another technical solution as follows: a power supply body, the power supply body is provided with a second connecting component and a second electrical connecting structure, the second connecting component is configured to achieve a detachable structure connection with an outer wire organizer, and the second electrical connecting structure is configured to being electrically connected with the outer wire organizer.

Compared with the prior art, the wire organizer and the charging module provided by the present invention have the following beneficial effects:

1. Wire storage and flexibility are both achieved. The wire organizer provided by the present invention includes the storage component, the first contact portion and the first magnet component, the storage component achieves a wire storage function, the first contact portion and the first magnet component achieve that the wire organizer is flexibly connected with other power supply bodies, and achieve free power supply and easy disassembly and assembly. Compared with functional products integrally connected with the wire, the wire organizer provided by the present invention is more flexible, can be matched in different functional products at will, meets different usage scenarios, increases the versatility of the functional products, and is matched with different types of wires for use.

2. Structure integrity is achieved. The wire organizer provided by the present invention is further provided with the first fixing portion, the first fixing portion is configured to be connected with the functional products, such as an adapter body and a portable power source body, thereby improving the structure integrity of the functional products.

DESCRIPTION OF REFERENCE NUMERALS

100, wire organizer; 200, power adapter; 400, car charger;

10, first shell component; 101, through hole; 11, upper shell; 12, lower shell; 120, first electrical connecting structure; 121, first contact portion; 1211, first contact terminal set; 12111, signal terminal; 12112, positive terminal; 12113, negative terminal; 1212, first limiting structure; 13, fixing groove; 140, first connecting component; 14, first fixing portion; 15, fixing piece; 16, first circuit board;

20, storage component; 21, storage seat set; 211, first storage seat; 212, second storage seat; 22, third magnetic component; 221, second magnetic sheet; 222, third magnetic sheet; 23, rotating shaft piece; 231, rotating shaft clamping groove; 24, gear; 241, first clamping groove; 2411, first step; 242, second clamping groove; 243, tooth; 25, pick; 251, first clamping piece; 252, second clamping piece; 253, third clamping piece; 254, pick body; 255, mounting portion;

30, wire; 31, charging end;

40, first magnetic component;

50, power supply body; 501, adapter body; 502, portable power source body; 503, car charger body; 51, input terminal; 520, second electrical connecting structure; 52, second contact portion; 521, second limiting structure; 522, second contact terminal set; 530, second connecting component; 53, second magnetic component; 54, second fixing portion; 55, power source adapting piece; 551, second circuit board; 552, third circuit board; 56, charging interface; and 57, storage groove.

DETAILED DESCRIPTION OF THE INVENTION

In order to make objectives, technical solutions and advantages of the present invention clearer, the present invention is further illustrated in detail with reference to accompanying drawings and implementation instances. It should be understood that specific embodiments described here are only used to illustrate the present invention, and not to limit the present invention.

In the embodiments provided by the present invention, it should be understood that "B corresponding to A" represents that B is associated with A, and B may be determined according to A. It should be further understood that determining B according to A does not mean that B is determined only according to A, and B may further be determined according to A and/or other information.

It should be understood that the entire specification referring to "one embodiment" or "an embodiment" means that specific features, structures, or characteristics related to the embodiments are included in at least one embodiment of the present invention. Therefore, "in one embodiment" or "in an embodiment" appearing in the entire specification may not necessarily refer to the same embodiment. In addition, these specific features, structures, or characteristics may be combined in one or more embodiments in any appropriate mode. Those skilled in the art should also know that the embodiments described in the specification all belong to optional embodiments, and involved actions and modules are not necessarily necessary for the present invention.

In various embodiments of the present invention, it should be understood that the sequence number of the above procedures does not imply the necessary order of execution, the execution sequence of the procedures should be determined by its function and internal logic, and should not constitute any limitation to the implementation process of the embodiments of the present invention.

It needs to be noted that when an element is called "fixed" to another element, it may be on another element, or there may also be an intermediate element. When an element is considered to "connect" another element, it may be directly connected to another element, or there may be an intermediate element at the same time.

It needs to be understood that orientation or position relationships indicated by terms "length", "width", "up", "down", "front", "back", "left", "right", "vertical", "horizontal", "top", "bottom", "inner", "outer", etc. are orientation or position relationships shown based on accompanying drawings, only convenient for the description of the present invention and simplifying the description, are not indicated or imply that referred devices or elements must have specific orientations, construct and operate with specific orientations, and therefore, it should not be understood as a limitation to the present invention.

In addition, terms "first" and "second" are only used to describe objectives, and cannot be understood as indicating or implying relative importance or as implicitly indicating the quantity of technical features indicated. Thus, features defined as "first" and "second" may explicitly or implicitly include one or more features. In the description of the present invention, "multiple" means two or more than two, unless otherwise expressly specified.

Unless otherwise defined, all technical and scientific terms used herein have the same meaning as should normally be understood by the technical personnel in the technical art belonging to the present invention. In the text, the terms used in the specification of the present invention are only used to describe objectives of specific implementations, and are not intended to limit the present invention.

Figure 1:
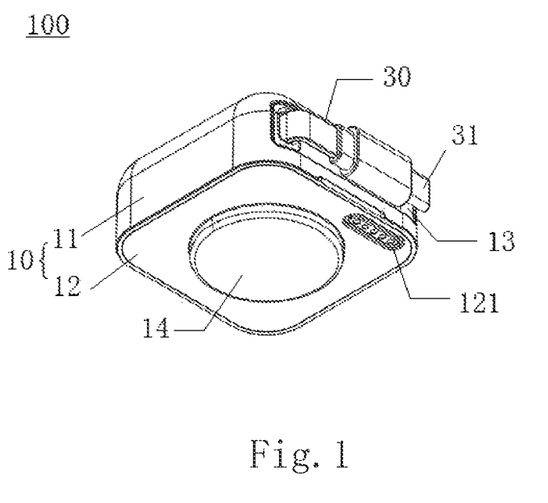
FIG. 1 is a schematic structural diagram of a wire organizer of the present invention.
Figure 2:
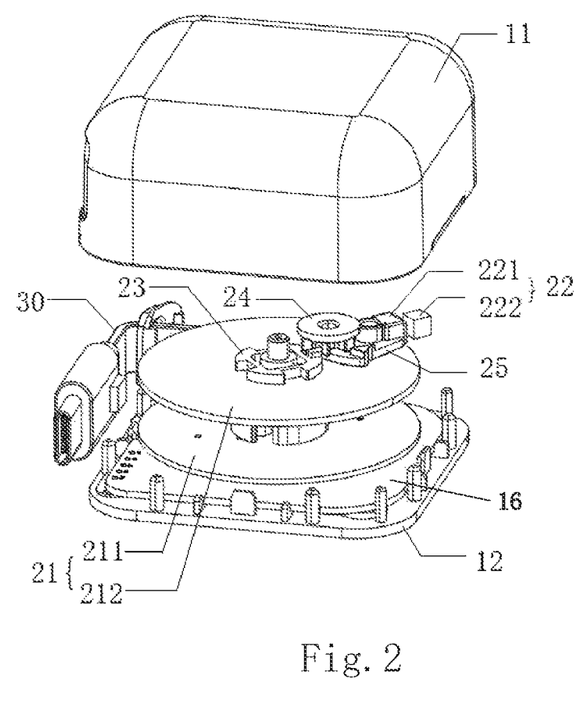
FIG. 2 is a schematic structural diagram of a storage component of the present invention.
Figure 9:
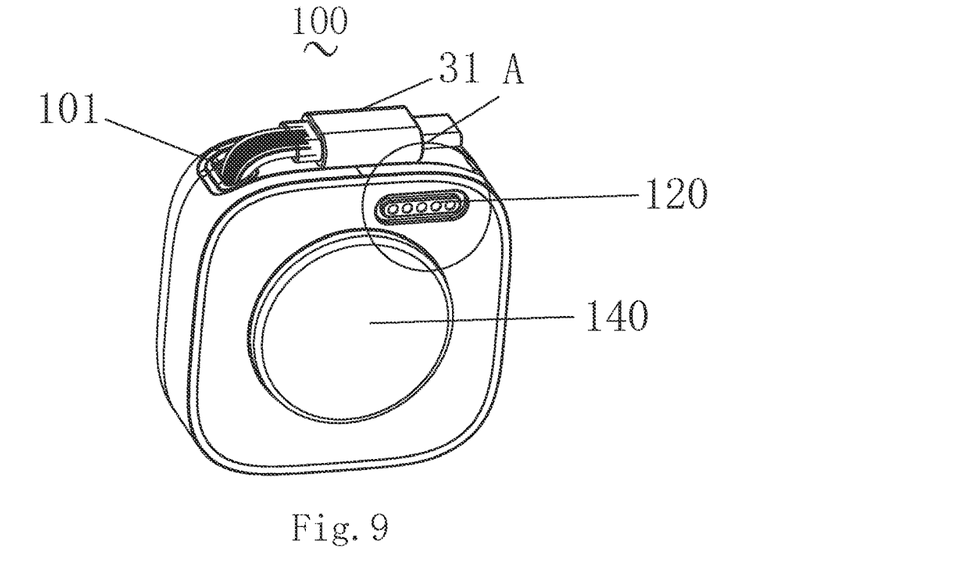
FIG. 9 is a second schematic structural diagram of a wire organizer of the present invention.
Figure 11:
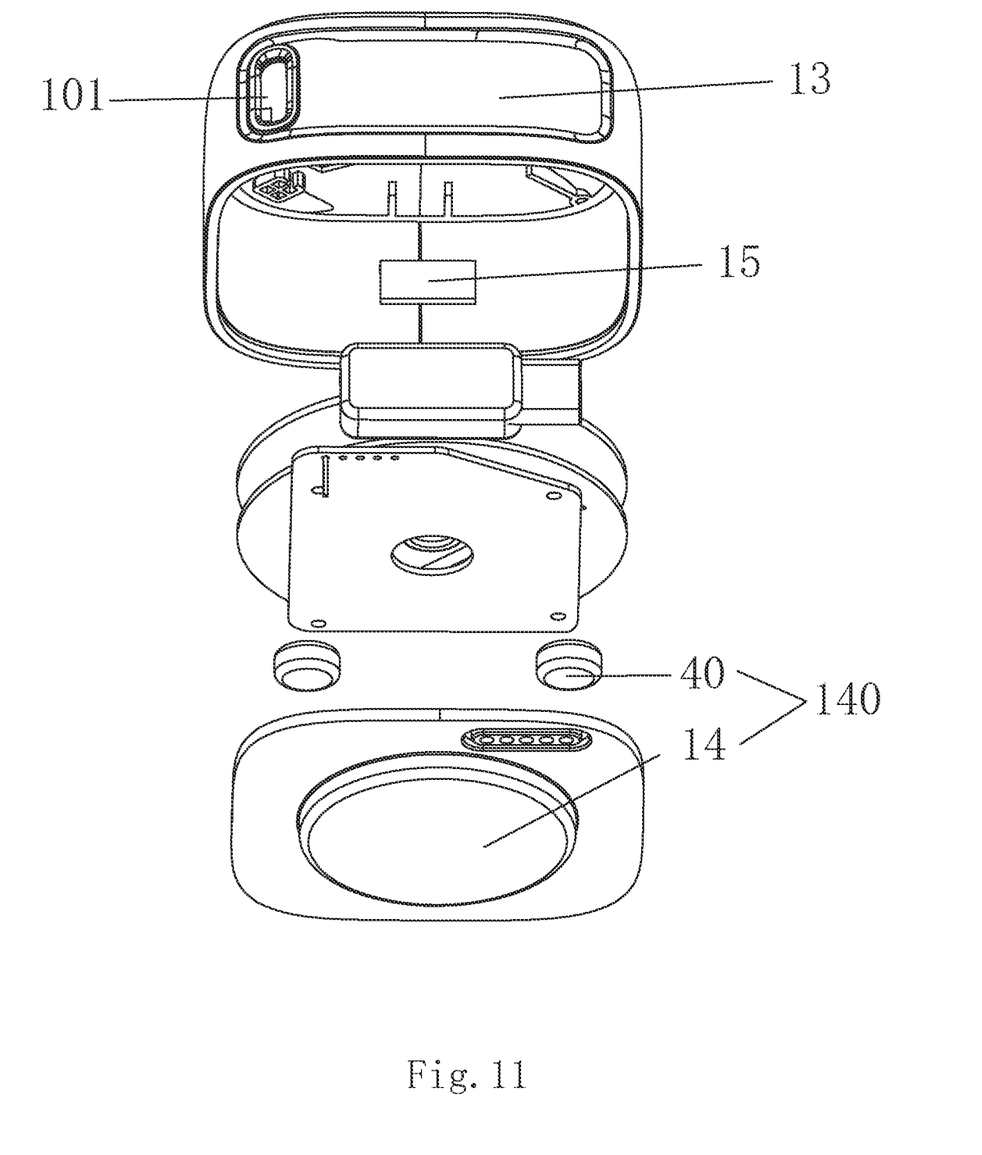
FIG. 11 is a schematic exploded view of a wire organizer of the present invention.

FIG. 1 shows a schematic structural diagram of a wire organizer 100, and FIG. 2 shows a schematic structural diagram of a storage component 20. With reference to FIG. 9 and FIG. 11, this embodiment provides a wire organizer 100, and the wire organizer 100 is provided with a first connecting component 140 and a first electrical connecting structure 120; and the first connecting component 140 is configured to achieve a structural connection such as a clamping connection with other external parts, and the first electrical connecting structure 120 is configured to be electrically connected with other external parts.

Further, the first connecting component 140 includes a first fixing portion 14 and a first magnet component 40; and the first fixing portion 14 is configured to be clamped with other external parts, and the first magnet component 40 is configured to achieve a detachable magnet connection with other external parts.

Further, the first electrical connecting structure 120 includes a first contact portion 121, and the first contact portion 121 is configured to achieve a contact electrical connection with other external parts.

Specifically, with reference to FIG. 1 and FIG. 2, the wire organizer 100 includes a first shell component 10, a storage component 20 and a wire 30 are mounted in the first shell component 10, one end of the wire 30 is movably connected to the storage component 20, and the other end of the wire 30 penetrates through an outer side of the first shell component 10. At the same time, the first shell component 10 further includes the first magnet component 40 (not shown in FIG. 1 and FIG. 2, and see details in FIG. 6) and the first contact portion 121. The wire organizer 100 further has functions of flexibly replacing and assembling with functional products and electrifying while achieves storage of the wire 30.

Specifically, the first shell component 10 includes an upper shell 11 and a lower shell 12 which are connected, and an inner surface of the lower shell 12 is connected with the first magnet component 40. The first magnet component 40 includes first magnet sheets. In this embodiment, the first magnet component 40 includes four first magnet sheets, the first magnet sheets are respectively arranged at four opposite angles of the lower shell 12, so as to ensure that the wire organizer 100 has the stability when fixed to the functional products.

The first contact portion 121 is arranged on the outer surface of the lower shell 12, in this embodiment, the first contact portion 121 is a conductive female seat, provided with a plurality of parallelly arrayed copper columns, one end of the first contact portion 121 is used to complete a power supply connection with an external power supply body 50, such as a power source adapter body and a portable power source body, and the other end of the first contact portion 121 is connected with the wire 30, for conveniently achieving electrical energy output.

Figure 6:
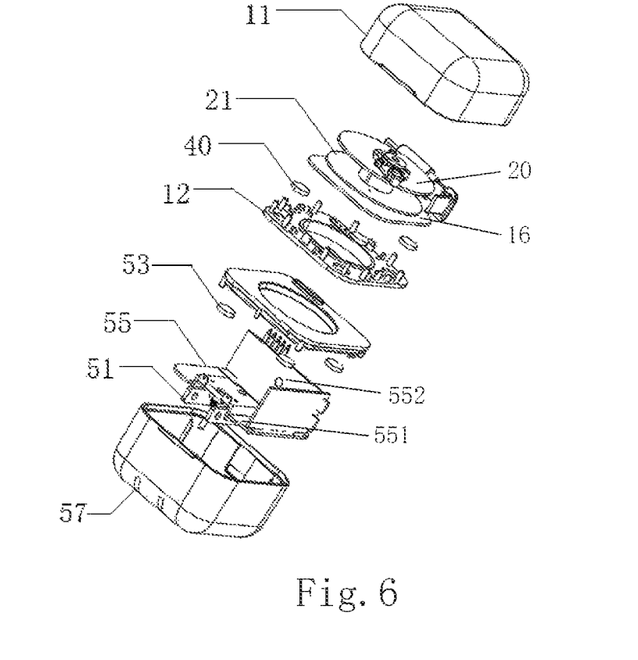
FIG. 6 is a schematic exploded view of a power adapter of the present invention.

Further, please refer to FIG. 6, the wire organizer 100 further includes a first circuit board 16, the storage component 20 is arranged on a top face of the first circuit board 16, the wire 30 wound on the storage component 20 is electrically connected with the first circuit board 16, the first electrical connecting structure 120 is arranged on a bottom face of the first circuit board 16, the first electrical connecting structure 120 is electrically connected with the first circuit board 16, and the wire 30 is electrically connected with the first electrical connecting structure 120 through the first circuit board 16.

Figure 12:
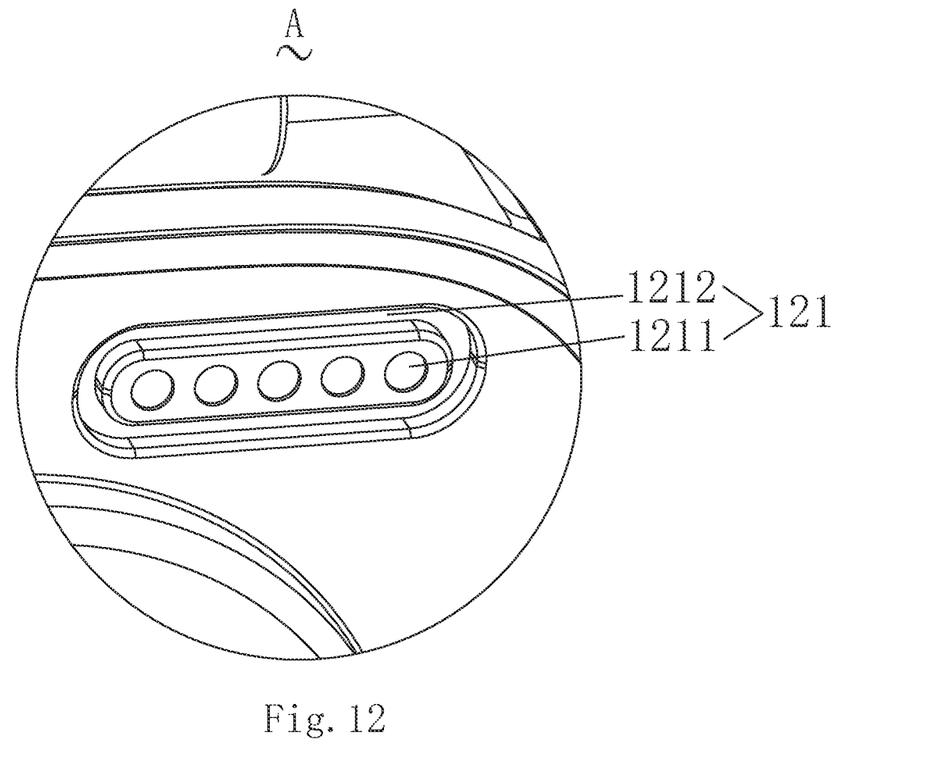
FIG. 12 is an enlarged view of A in FIG. 9.

Further, please refer to FIG. 12, the first contact portion 121 includes a first contact terminal set 1211 and a first limiting structure 1212 arranged around the first contact terminal set 1211.

Optionally, the first contact portion 121 is the conductive male seat or the conductive female seat; and correspondingly, the first limiting structure 1212 may be a hump structure or a groove structure.

Figure 13:
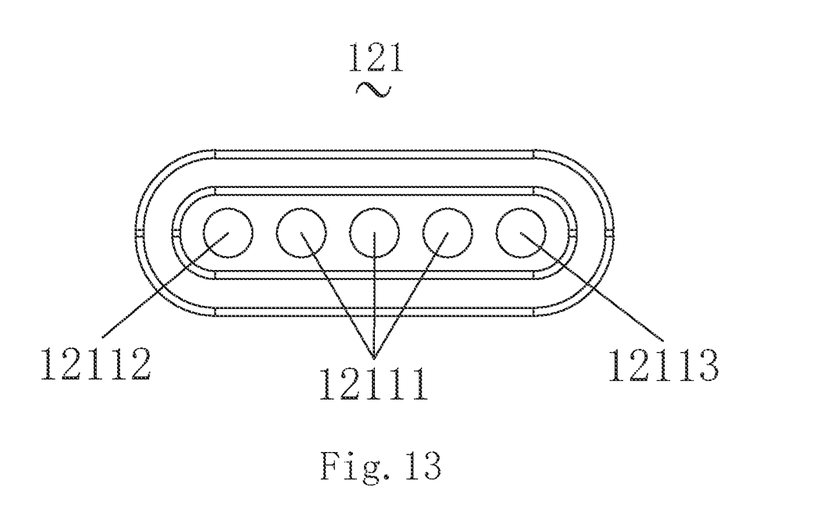
FIG. 13 is a schematic diagram of a first contact terminal set of the present invention.

Further, please refer to FIG. 12 and FIG. 13, the first contact terminal set 1211 includes signal terminals 12111, a positive terminal 12112 and a negative terminal 12113, and each signal terminal 12111 includes a fast-charging recognition terminal.

Specifically, in this embodiment, the first contact portion 121 includes five terminals arranged in a linear sequence, the positive terminal 12112 and the negative terminal 12113 are respectively located at the two ends, and the three signal terminals 12111 are located in the middle.

Further, the three signal terminals 12111 located in the middle are all fast-charging recognition terminals.

It needs to be specifically noted that the first magnet component 40 and the first contact portion 121 are both located at one end where the lower shell 12 of the wire organizer 100 is located, which is conductive to the wire organizer 100 and the functional products to be fixed while achieving the power supply connection. Meanwhile, a magnet fixed mode improves the flexibility of the wire organizer 100, so that it has a function of easy to disassemble and assemble.

Figure 3:
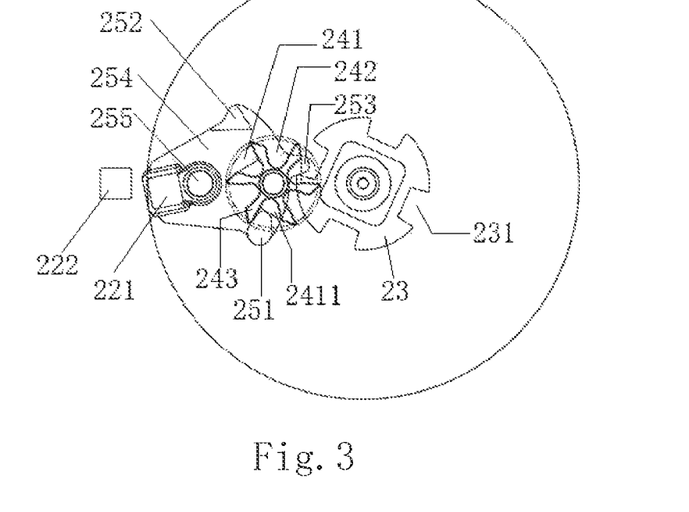
FIG. 3 is a schematic structural diagram of a storage component in a self-locking state of the present invention.
Figure 4:
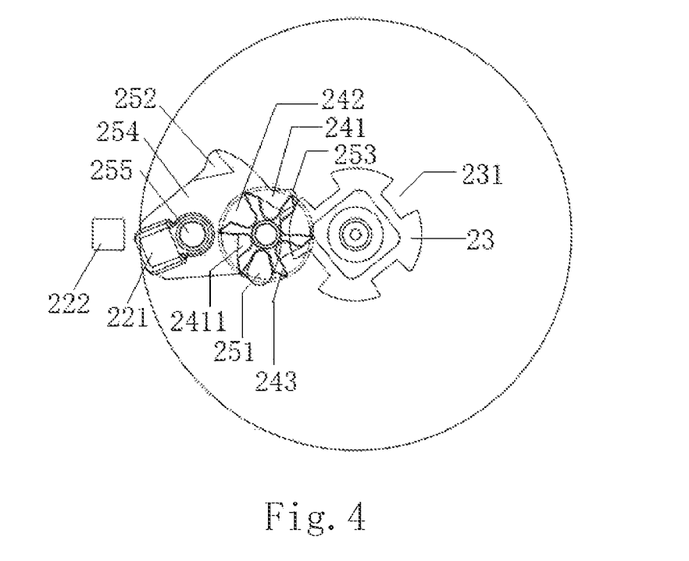
FIG. 4 is a schematic structural diagram of a storage component in an unlocking state of the present invention.

The storage component 20 is mounted between the upper shell 11 and the lower shell 12, and the storage component 20 includes a storage seat set 21, and a third magnet component 22, a rotating shaft piece 23, a gear 24 and a pick 25 connected with the storage seat set 21. FIG. 3 and FIG. 4 respectively show schematic structural diagrams of the storage component 20 in a self-locking state and an unlocking state.

With reference to FIG. 2 to FIG. 4, the storage seat set 21 includes a first storage seat 211 and a second storage seat 212 which are coaxially connected, and a storage end of the wire 30 is fixed to a rotating shaft between the first storage seat 211 and the second storage seat 212, and electrically connected with the first contact portion 121. A charging end 31 of the wire 30 penetrates through the first shell component 10, the wire 30 is completely wound on the rotating shaft, and with pulling the wire 30, the storage seat set 21 will rotate.

The rotating shaft piece 23 is arranged on one side of the first storage seat 211 close to the upper shell 11, coaxially connected with the rotating shaft, and rotates with rotation of the storage seat set 21. A plurality of rotating shaft clamping grooves 231 are formed in a circumferential direction of the rotating shaft piece 23. The rotating shaft clamping grooves 231 are connected with the pick 25 to drive the pick 25 to move.

Specifically, the pick 25 is movably connected to the upper shell 11, and is located on the same side of the first storage seat 211 with the rotating shaft piece 23.

First clamping pieces 251, second clamping pieces 252 and third clamping pieces 253 are arranged at one end of the pick 25 close to the rotating shaft piece 23. The first clamping pieces 251 and the second clamping pieces 252 are symmetrically arranged on two sides of a pick body 254, and protrude out of the pick body 254 and point to a direction where the rotating shaft piece 23 is located. The third clamping pieces 253 protrude towards the rotating shaft piece 23, and may be clamped in the rotating shaft clamping grooves 231.

At one end away from the rotating shaft piece 23, a main body of the pick 25 is provided with a mounting portion 255 for being connected with the upper shell 11, and the mounting portion 255 and the third clamping pieces 253 are located on a center line of the pick 25.

The main body of the pick 25 is further connected with a second magnet sheet 221 of the third magnet component 22 at one end away from the rotating shaft piece 23, the third magnet component 22 further includes a third magnet sheet 222, and the third magnet sheet 222 is fixedly connected to the upper shell 11. When the pick 25 rotates under an external force, after the external force disappears, the pick 25 will convolute under the action of the third magnet component 22.

One side of the pick 25 close to the upper shell 11 is further connected with the gear 24, the gear 24 includes a plurality of teeth 243, and first clamping grooves 241 and second clamping grooves 242 are respectively formed among the teeth 243. The first clamping grooves 241 are provided with first steps 2411. It needs to be specifically noted that the first clamping pieces 251 abut against the teeth 243 on one sides of the first camping grooves 241 when clamped with the first clamping grooves 241, and are limited by the teeth 243. The second clamping pieces 252 may drive the gear 24 to rotate with the rotation of the pick 25 when clamped with the first clamping grooves 241 or the second clamping grooves 242, and therefore, under the cooperation of the pick 25, the gear 24 and the rotating shaft piece 23, the self-locking state or the unlocking state of the storage component 20 may be achieved.

Specifically, when in an initial state, the third magnet component 22, the pick 25, the gear 24 and the rotating shaft piece 23 are on the same straight line, and the third clamping pieces 253 are clamped into the rotating shaft clamping grooves 231. When the wire 30 is required for charging, the wire 30 is pulled to make the first storage seat 211 rotate anticlockwise, the rotating shaft piece 23 rotates anticlockwise with the first storage seat 211, and drives the pick 25 to rotate clockwise through the third clamping pieces 253. At the moment, the second clamping pieces 252 are clamped into the second clamping grooves 242, the first clamping pieces 251 are away from the gear 24, and the third magnet sheets 222 deviate from the second magnet sheets 221.

Under the action of the third magnet component 22, the pick 25 has the tendency of rotating anticlockwise, meanwhile, after the external force pulling the wire 30 disappears, the first storage seat 211 has the tendency of rotating clockwise. Under the dual action of the third magnet component 22 and the first storage seat 211, the third magnet component 22, the pick 25, the gear 24 and the rotating shaft piece 23 rotate and exceed an initial position. As shown in FIG. 3, at the moment, the first clamping pieces 251 are camped into the first clamping grooves 241, the second clamping pieces 252 are away from the gear 24, and the third clamping pieces 253 abut against the rotating shaft clamping grooves 231. The pick 25 has the tendency of moving anticlockwise under the driving of the first storage seat 211 rotates clockwise, however, at the moment, the first clamping pieces 251 abut against the teeth 243 on one sides of the first clamping grooves 241, causing that the pick 25 cannot move anticlockwise, the third clamping pieces 253 block the rotating shaft piece 23 from moving anticlockwise, the first storage seat 211 cannot retract the wire 30, so that the wire 30 is fixed, and a self-locking function of the storage component 20 is achieved.

When the wire 30 needs to be retracted, the wire 30 is pulled again to make the first storage seat 211 and the rotating shaft piece 23 rotate anticlockwise, the third clamping pieces 253 drive the pick 25 to rotate clockwise, until the first clamping pieces 251 are away from the first clamping grooves 241, the second clamping pieces 252 are clamped into the second clamping grooves 242, and the third magnet sheets 222 are away from the second magnet sheets 221. After the wire 30 is loosened, the first storage seat 211 has the tendency of rotating clockwise, the pick 25 has the tendency of rotating anticlockwise under the action of the third magnet component 22, and the third magnet component 22, the pick 25, the gear 24 and the rotating shaft piece 23 rotate and exceed the initial position. As shown in FIG. 4, at the moment, the first clamping pieces 251 are camped into the second clamping grooves 242, the second clamping pieces 252 are away from the gear 24, and the third clamping pieces 253 abut against the outer side of the rotating shaft piece 23. Therefore, the rotating shaft piece 23 may continue to rotate clockwise, until under the action of the third magnet component 22, the pick 25, the gear 24 and the rotating shaft piece 23 convolute to the initial state, so as to complete winding storage of the wire 30.

In this embodiment, the way by pulling the wire 30 to make the storage component 20 respectively in the self-locking state or the unlocking state to complete switching of the states of the storage component 20 is simple and easy to operate. Meanwhile, in the process of the pick 25 of the sheet structure being matched with the gear 24 and the rotating shaft piece 23, the arm of force of the first clamping pieces 251, the second clamping pieces 252 and the third clamping pieces 253 is shortened. Compared with the hollowed-out pick 25 or the pick 25 with the long arm of force, the structure stability of the pick 25 is improved, a service life of the pick 25 is prolonged, and the pick 25 is prevented from being broken easily. Meanwhile, the pick 25 is matched with the rotating shaft piece 23 more smoothly, and abnormal sound is not prone to being generated.

Specifically, the precision of stretching and adjusting the wire 30 is associated with the distribution density of the first clamping grooves 241 and the second clamping grooves 242 in the gear 24, the higher the distribution density of the first clamping grooves 241 and the second clamping grooves 242, the higher the precision of stretching and adjusting the wire 30, and therefore, the quantity of the first clamping grooves 241 and the second clamping grooves 242 may be adjusted according to the need.

In addition, it needs to be noted that the wire 30 is further connected with a clockwork spring, so that the first storage seat 211 has a convolution function after pulling the wire 30.

The storage end of the wire 30 is electrically connected with the first contact portion 121, and the charging end 31 penetrates through the first shell component 10 and then is fixed to the outer side of the first shell component 10. Further, a fixing groove 13 is formed in the outer side of the first shell component 10, and the fixing groove 13 is provided with a fixing piece 15 (please refer to FIG. 11).

Figure 10:
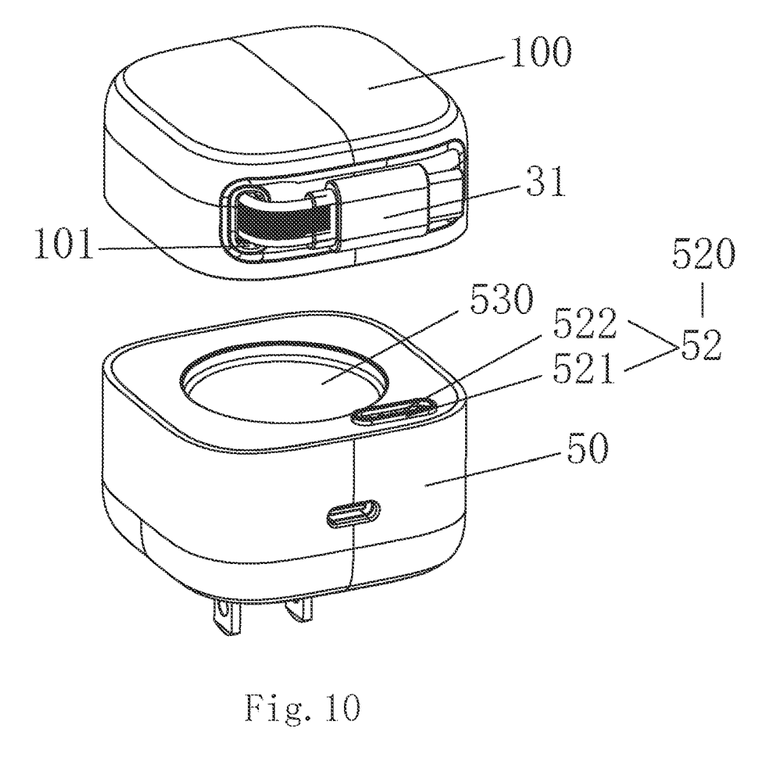
FIG. 10 is a first schematic exploded view of a charging module of the present invention.

Further, please refer to FIG. 9 to FIG. 11, a through hole 101 is formed in the first shell component 10, and the charging end 31 of the wire 30 penetrates through from the through hole 101 and is detachably fixed to the fixing groove 13.

Optionally, the fixing piece 15 is arranged on the outer wall face or the inner wall face of the first shell component 10 corresponding to the fixing groove 13. The fixing piece 15 may be a buckle, a magic tape, a magnet sheet and a structure capable of fixing the charging end 31. On the contrary, regardless of whether the fixing piece 15 is the buckle, the magic tape, or the magnet sheet, corresponding buckle, magic tape, or magnet sheet needs to be arranged on the charging end 31 for cooperation.

It may be understood that when the fixing piece 15 is the magic tape and buckle, the fixing piece 15 needs to be arranged on the outer wall face of the first shell component 10; and when the fixing piece 15 is the magnet sheet, the fixing piece 15 may be arranged on the inner wall face or the outer wall face of the first shell component 10.

Besides, the charging end 31 is provided with at least one charging interface, and the charging interface may be one or more of a USB interface, a Type-C interface, and a Lighting interface, or an interface for charging that can be predicted in the future.

Further, please refer to FIG. 11, the lower shell 12 of the first shell component 10 is further provided with a first fixing portion 14, and the first fixing portion 14 may be a convex plate, a groove, a buckle or other structures, for being further fixed to the functional products, and increasing the apparent integrality of the functional products.

Further, the first magnet component 40 is arranged along the periphery of the first fixing portion 14.

In conclusion, this embodiment provides the wire organizer 100, the wire organizer 100 includes the storage component 20, the first magnet component 40 and the first contact portion 121, has functions of storing the wires 30 and electrifying, may be flexibly mounted in different function products, thereby meeting different usage scenarios, and optimizing the charging experience.

Embodiment 2

Please refer to FIG. 9 to FIG. 11, this embodiment provides a charging component, the charging component includes a power supply body 50 and a wire organizer 100 provided by Embodiment 1, and the power supply body 50 is detachably connected with the wire organizer 100.

The wire organizer 100 is provided with a first connecting component 140, the power supply body 50 is provided with an adaptive second connecting component 530, and the wire organizer 100 is detachably connected with the power supply body 50 through the first connecting component 140 and the second connecting component 530; and the wire organizer 100 is provided with a first electrical connecting structure 120, the power supply body 50 is provided with a second electrical connecting structure 520, and when the first electrical connecting structure 120 is connected with the second electrical connecting structure 520, the wire organizer 100 is electrically connected with the power supply body 50.

Figure 5:
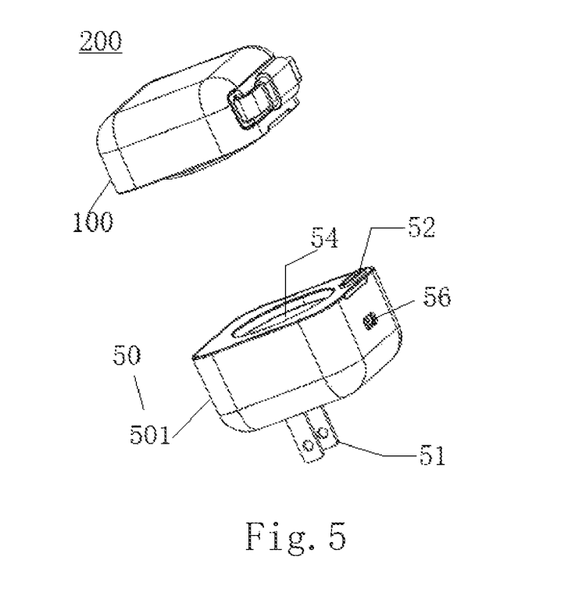
FIG. 5 is a schematic structural diagram of a power adapter of the present invention.

Further, please refer to FIG. 5, FIG. 6 and FIG. 10, the second connecting component 530 includes a second fixing portion 54 and a second magnet component 53, and the second electrical connecting structure 520 includes a second contact portion 52.

The second contact portion 52 includes a second contact terminal set 522. The second contact portion 52 further includes a second limiting structure 521 arranged around the second contact terminal set 522. The first limiting structure 1212 is adaptive to the second limiting structure 521.

In this embodiment, taking the power supply body 50 being a power source adapter 200 of an adapter body 501 as an example, the charging component is illustrated with examples.

FIG. 5 and FIG. 6 show a schematic structural diagram and a schematic exploded view of the power source adapter 200 of this embodiment. With reference to FIG. 2, FIG. 5 and FIG. 6, the adapter body 501 includes an input terminal 51 for power supply, the second contact portion 52 adaptive to the first contact portion 121 and the second magnet component 53 adaptive to the first magnet component 40.

The adapter body 501 is provided with a storage groove 57, and the input terminal 51 is movably connected to the storage groove 57. In this embodiment, the input terminal 51 is a two-seat plug. Certainly, the quantity of sockets of the adapter body 501 and its form are not specifically limited here, and related technical field personnel may perform corresponding replacement and improvement according to the need. The input terminal 51 is connected with a power source adapting piece 55 located in the adapter body 501. The power source adapting piece 55 is connected with the second contact portion 52. In this embodiment, the second contact portion 52 is a conductive male seat adaptive to the first contact portion 121, and the conductive male seat is provided with a plurality of vibrating needles.

Specifically, the second magnet component 53 is arranged in the adapter body 501 and at one end close to the wire organizer 100. Meanwhile, the adapter body 501 is further provided with a second fixing portion 54 at this end. In this embodiment, the second fixing portion 54 is of a groove structure, and is adaptive to the first fixing portion 14 with a hump structure in the wire organizer 100.

Further, please refer to FIG. 6 and FIG. 10, the power source adapting piece 55 includes a second circuit board 551 and a third circuit board 552, and the second circuit board 551 is perpendicular to the third circuit board 552; and the second circuit board 551 is electrically connected with the third circuit board 552, the input terminal 51 is arranged on the second circuit board 551, and the charging interface 56 and the second electrical connecting structure 520 are arranged on the third circuit board 552.

When in use, the first fixing portion 14 of the wire organizer 100 is clamped into the second fixing portion 54 of the adapter body 501, so that the structure between the wire organizer 100 and the adapter body 501 is more stable. The first contact portion 121 is electrically connected with the second contact portion 52, so as to form an electrical path between the adapter body 501 and the wire organizer 100. The first magnet component 40 is connected with the second magnet component 53, so as to complete the assembly of the power source adapter 200. The first magnet component 40 and the second magnet component 53 facilitate the disassembly and assembly of the power source adapter 200, and the wire organizers 100 at different changing ends 31 may be replaced according to the need.

Specifically, in order to facilitate the cooperation between the wire organizers 100 and the adapter body 501, the first fixing portion 14 and the first electrical connecting structure 120 are arranged on the same outer wall face of the wire organizer 100, and the second fixing portion 54 and the second electrical connecting structure 520 are arranged on the same outer wall face of the power supply body 50.

Further, the first magnet component 40 is arranged along the periphery of the first fixing portion 14, and the second magnet component 53 is arranged along the periphery of the second fixing portion 54. The first magnet component 40 and the second magnet component 53 on the periphery are matched and positioned, so that quick automatic alignment and assembly between the first fixing portion 14 and the second fixing portion 54 are achieved.

Further, the second contact portion 52 includes a second limiting structure 521, and the second limiting structure 521 is adaptive to the first limiting structure 1212.

Further, the adapter body 501 is further provided with a charging interface 56, thereby improving the flexibility of the power source adapter 200, and meeting different usage scenarios.

Further, the power supply body 50 is further provided with the charging interface 56, and the charging interface 56 is electrically connected with the power source adapting piece 55; and further, the charging interface 56 on the power supply body 50 and the fixing groove 13 are located on the same outer side face of the charging component.

Further, the first electrical connecting structure 120 is electrically connected with the power source adapting piece 55 through the second electrical connecting structure 520.

When only the charging end 31 is connected with an external device for charging work, the charging end 31 supplies power with a first power;

when only the charging interface 56 is connected with an external device for charging work, the charging interface 56 supplies power with a second power; and when the charging end 31 and the charging interface 56 are simultaneously connected with an external device for charging work, the charging end 31 and the charging interface 56 supply power with a third power.

Further, the first power and the second power are greater than the third power.

Specifically, in this embodiment, the charging end 31 is the lightning terminal, and its first power when working alone is 27 W;

the charging interface 56 is the Type-C terminal, and its second power when working alone is 35 W; and the third power is 17.5 W when the charging end 31 and the charging interface 56 work at the same time.

It may be understood that charging states of the charging end 31 and the charging interface 56 are recognized through the signal terminal 12111.

Embodiment 3

Tis embodiment provides a charging component, and the charging component includes a power supply body 50 and a wire organizer 100 provided by Embodiment 1. In this embodiment, the charging component is illustrated by taking the power supply body 50 as a portable power source of a portable power source body 502 as an example.

Figure 7:
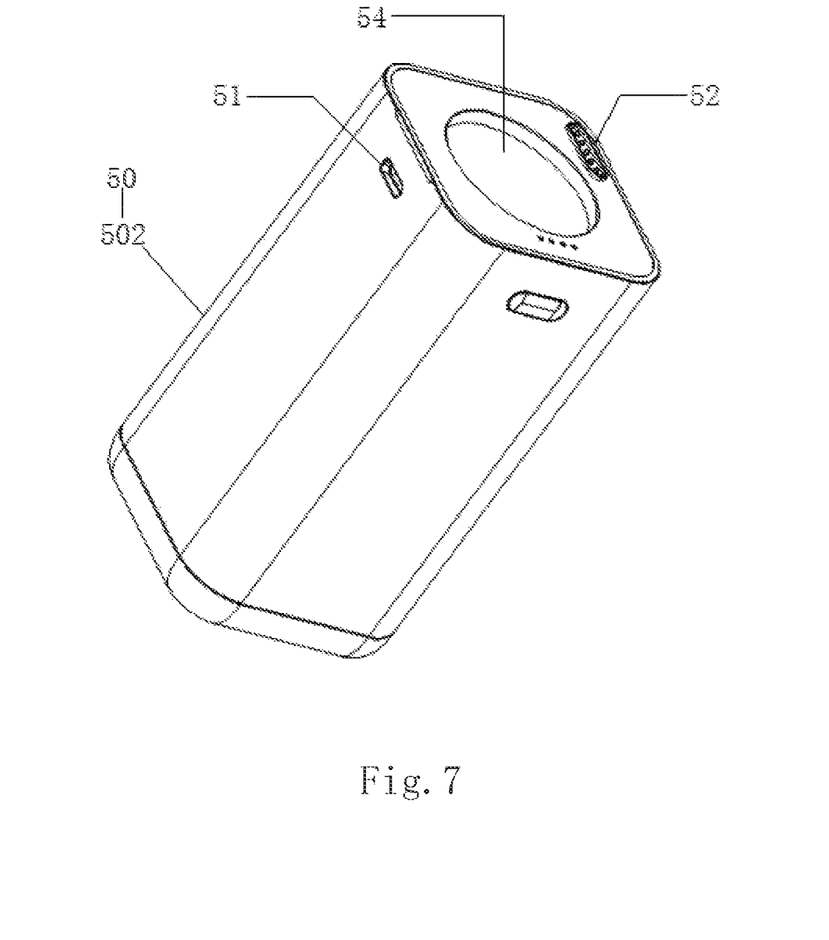
FIG. 7 is a schematic structural diagram of a portable power source body of the present invention.

FIG. 7 shows a schematic structural diagram of a portable power source body 502 of this embodiment. A portable power source includes the portable power source body 502 and the wire organizer 100 provided by Embodiment 1.

Specifically, the portable power source body 502 includes an energy storage battery (not marked in the figure) and an input terminal 51. The input terminal 51 is one or more of a USB interface, a Type-C interface and a Lighting interface. Certainly, the kinds of the input terminal 51 are not limited here, and the input terminal 51 may further be other predictable charging and/or discharging interface kinds. The input terminal 51 is arranged on the side wall of the portable power source body 502, and connected with the energy storage battery (not marked in the figure) in the portable power source body 502. One end of the portable power source body 502 is provided with a second contact portion 52. In this embodiment, the second contact portion 52 is a conductive male seat adaptive to the first contact portion 121, and the conductive male seat is provided with a plurality of vibrating needles. After the second contact portion 52 is connected with the first contact portion 121, an electrical path between the portable power source body 502 and the wire organizer 100 may be formed.

Further, at one end where the second contact portion 52 is located, the portable power source body 502 is further provided with a second magnet component 53. The second magnet component 53 includes a plurality of magnet sheets, and the magnet sheets are arranged in the portable power source body 502. In this embodiment, the magnet sheets are evenly distributed on the inner side of an end face where the second contact portion 52 is located. Besides, the portable power source body 502 is further provided with a second fixing portion 54 at one end where the second contact portion 52 is located. In this embodiment, the second fixing portion 54 is of a groove structure, and is adaptive to the first fixing portion 14 with a hump structure in the wire organizer 100. When the portable power source body 502 is fixed to the wire organizer 100, the first fixing portion 14 is clamped with the second fixing portion 54, the good mounting hand feeling is provided, and meanwhile, the second magnet component 53 and the first magnet component 40 are attracted, thereby improving the structure stability of the portable power source, and being easy to disassemble. Certainly, it needs to be noted that the structures of the first fixing portion 14 and the second fixing portion 54 are not limited here, and the first fixing portion 14 and the second fixing portion 54 may also be of other mutually-matched fixing structures, such as a thread locking structure, a buckle structure, etc.

In this embodiment, the storage function of the wire organizer 100 increases the convenience when carrying the portable power source, and the problems of the wires 30 are mess and not easy to store are solved. Meanwhile, compared with the portable power source integrated with the power wires 30, the portable power source wires 30 of this embodiment adopt a mounting mode of disassembling the power wires 30, charging wires 30 may be replaced at will when facing electronic devices with different charging powers, and the integrality of the portable power source is ensured.

Embodiment 4

This embodiment provides a charging component, and the charging component includes a power supply body 50 and the wire organizer 100 provided by Embodiment 1. In this embodiment, the charging component is illustrated by taking the power supply body 50 as a car charger 400 of a car charger body 503 as an example.

Figure 8:
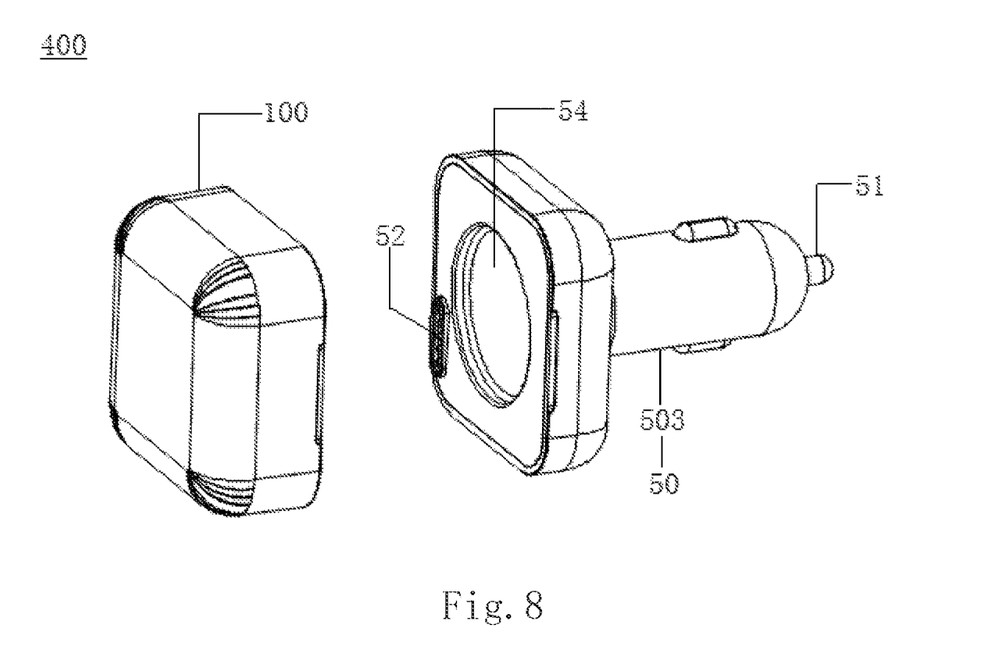
FIG. 8 is a schematic structural diagram of a car charger of the present invention.

FIG. 8 shows a schematic structural diagram of the car charger 400 of this embodiment. The car charger 400 includes the car charger body 503 for supplying power and the wire organizer 100 provided by Embodiment 1.

Specifically, one end of the car charger body 503 is provided with an input terminal 51, the structure of the input terminal 51 is adaptive to a vehicle cigarette lighter socket, and may be plugged into the cigarette lighter socket for supply power. The car charger body is internally provided with a power source switching piece (not marked in the figure), so as to switch an output voltage of a vehicle cigarette lighting system. One end of the car charger body 503 away from the input terminal 51 is provided with a second contact portion 52 and a second fixing portion 54. In this embodiment, the second contact portion 52 is a conductive male seat adaptive to the first contact portion 121, and the second contact portion 52 is provided with a plurality of vibrating needles. After the second contact portion 52 is connected with the first contact portion 121, an electrical path between the car charger body 503 and the wire organizer 100 may be formed.

Further, the second fixing portion 54 is of a groove structure, and is adaptive to the first fixing portion 14 of a hump structure in the wire organizer 100. When the car charger body 503 is fixed to the wire organizer 100, the first fixing portion 14 is clamped with the second fixing portion 54, and the good mounting hand feeling is provided.

Besides, similar to the power source adapter 200 provided by Embodiment 2, the car charger body 503 is further provided with a second magnet component 53 at one end where the second contact portion 52 is located. The second magnet component 53 includes a plurality of magnet sheets, and the magnet sheets are arranged in the car charger body 503. In this embodiment, the magnet sheets are evenly distributed on the inner side of the end face where the second contact portion 52 is located, thereby improving the structure stability of the wire organizer 100 and the car charger body 503, and being convenient to disassemble. When the wire organizer 100 needs to be mounted on the car charger body 503, the second magnet component 53 and the first magnet component 40 are attracted mutually, the first fixing portion 14 is clamped with the second fixing portion 54, the first contact portion 121 is electrically connected with the second contact portion 52, mounting is convenient, so that the car charger 400 has functions of storing wires and supplying power and electrifying, and the problem of low safety caused by mess wires in the travelling process is solved. Meanwhile, the car charger may replace different wire organizers 100 according to the needs of types of charging interfaces, thereby improving the flexibility of the car charger.

Certainly, it needs to be noted that the structures of the first fixing portion 14 and the second fixing portion 54 are not limited here, and the first fixing portion 14 and the second fixing portion 54 may also be other mutually-matched fixing structures, such as a thread locking structure, a buckle structure, etc.

In conclusion, the wire organizers 100 may be mounted on multiple power supply bodies 50, and may be flexibly used in different application places, so that the charging component has the structure integrity and versatility.

The wire organizer and the charging component disclosed by the embodiments of the present invention are described in detail, specific instances are used in the text to illustrate the principle and implementations of the present invention, and the explanation of the above embodiments is only used to help understanding methods of the present invention and its core idea; and meanwhile, for those ordinarily skilled in the art, according to the idea of the present invention, specific implementations and application scopes will be changed, in conclusion, the specification content should not be understood as limitation to the present invention, and any modification, equivalent replacement and improvement made within the principle of the present invention should be contained in the protection scope of the present invention.

The invention claimed is:

1. A charging module, comprising a power supply body and a wire organizer, wherein the power supply body is detachably connected with the wire organizer;
   the wire organizer is provided with a first connecting component, the power supply body is provided with an adaptive second connecting component, and the wire organizer is detachably connected with the power supply body through the first connecting component and the second connecting component; and
   the wire organizer is provided with a first electrical connecting structure, the power supply body is provided with a second electrical connecting structure, and in a case that the first electrical connecting structure is connected with the second electrical connecting structure, the wire organizer is electrically connected with the power supply body;
   wherein the first electrical connecting structure comprises a first contact portion, the first contact portion comprises a first contact terminal set, the second electrical connecting structure comprises a second contact portion, and the second contact portion comprises a second contact terminal set;
   wherein the first contact terminal set and the second contact terminal set each comprises a signal terminal, a positive terminal and a negative terminal.

2. The charging module according to claim 1, wherein the first connecting component comprises a first fixing portion and a first magnet component, the second connecting component comprises a second fixing portion and a second magnet component, the first fixing portion is adaptive to the second fixing portion, and the first magnet component is adaptive to the second magnet component.

3. The charging module according to claim 2, wherein the first fixing portion comprises a convex plate and/or a groove; the second fixing portion comprises a groove and/or a convex plate adaptive to the first fixing portion; and the first fixing portion and the first electrical connecting structure are arranged on the same outer wall face of the wire organizer, and the second fixing portion and the second electrical connecting structure are arranged on the same outer wall face of the power supply body.

4. The charging module according to claim 2, wherein the first magnet component is arranged along a periphery of the first fixing portion, and the second magnet component is arranged along a periphery of the second fixing portion.

5. The charging module according to claim 1, wherein the first contact portion further comprises a first limiting structure arranged around the first contact terminal set, the second contact portion further comprises a second limiting structure arranged around the second contact terminal set, and the first limiting structure is adaptive to the second limiting structure.

6. The charging module according to claim 1, wherein the wire organizer comprises a first shell component, and a storage component and a wire mounted in the first shell component, the storage component is rotatably arranged, one end of the wire is wound on the storage component and electrically connected with the first electrical connecting structure, and the other end of the wire penetrates through the first shell component to be exposed.

7. The charging module according to claim 6, wherein the wire organizer further comprises a first circuit board, the storage component is arranged on a top face of the first circuit board, the wire wound on the storage component is electrically connected with the first circuit board, the first electrical connecting structure is arranged on a bottom face of the first circuit board, and the first electrical connecting structure is electrically connected with the first circuit board.

8. The charging module according to claim 6, wherein the exposed end of the wire is a charging end, and the charging end is detachably fixed to an outer side of the first shell component.

9. The charging module according to claim 8, wherein the first shell component is provided with a fixing groove, an outer wall face or an inner wall face of the first shell component is provided with a fixing piece corresponding to the fixing groove, and the charging end is detachably fixed to the fixing groove through the fixing piece.

10. The charging module according to claim 6, wherein the storage component comprises a storage seat set, and a third magnet component, a rotating shaft piece, a gear and a pick connected with the storage seat set; and
    the third magnet component comprises a second magnet sheet and a third magnet sheet mutually magnetized, the second magnet sheet is fixedly connected to the first shell component, and the third magnet sheet is connected to one end of the pick; the other end of the pick is provided with a first clamping piece, a second clamping piece and a third clamping piece; the rotating shaft piece is provided with a rotating shaft clamping groove, and the third clamping piece protrudes towards the rotating shaft piece; the gear is movably connected with the pick, the gear comprises a plurality of first clamping grooves and second clamping grooves arranged at intervals, and the first clamping grooves are provided with first steps; and the pick rotates under driving of the rotating shaft piece, and drives the gear to rotate through the first clamping piece or the second clamping piece.

11. The charging module according to claim 8, wherein the charging end is provided with at least one charging interface, and the charging interface is one or more of a USB interface, a Type-C interface, or a Lighting interface.

12. The charging module according to claim 1, wherein the power supply body is one of an adapter body, a portable power source body, or a car charger body.

13. The charging module according to claim 9, wherein the power supply body further comprises an input terminal, the power supply body is further internally provided with a power source adapting piece, the power supply body is further provided with a charging interface, the input terminal, the charging interface and the second electrical connecting structure are electrically connected with the power source adapting piece respectively, and the first electrical connecting structure is electrically connected with the power source adapting piece through the second electrical connecting structure.

14. The charging module according to claim 13, wherein the power source adapting piece comprises a second circuit board and a third circuit board, and the second circuit board is perpendicular to the third circuit board; and the second circuit board is electrically connected with the third circuit board, the input terminal is arranged on the second circuit board, and the charging interface and the second electrical connecting structure are arranged on the third circuit board.

15. The charging module according to claim 13, wherein the fixing groove and the charging interface on the power supply body are located on the same outer side face of the charging module.

16. The charging module according to claim 14, wherein in a case that only the charging end is connected with an external device for charging work, the charging end supplies power with a first power;

in a case that only the charging interface on the power supply body is connected with the external device for charging work, the charging interface on the power supply body supplies power with a second power;

in a case that the charging end and the charging interface on the power supply body are simultaneously connected with the external device for charging work, the charging end and the charging interface on the power supply body supply power with a third power; and the first power and the second power are both greater than the third power.

17. A wire organizer, wherein the wire organizer is provided with a first connecting component and a first electrical connecting structure, the first connecting component is configured to achieve a detachable structure connection with an outer power supply body, and the first electrical connecting structure is configured to being electrically connected with the outer power supply body, wherein the first electrical connecting structure comprises a first contact portion, the first contact portion comprises a first contact terminal set, wherein the first contact terminal set each comprises a signal terminal, a positive terminal and a negative terminal.

18. A power supply body, wherein the power supply body is provided with a second connecting component and a second electrical connecting structure, the second connecting component is configured to achieve a detachable structure connection with an outer wire organizer, and the second electrical connecting structure is configured to being electrically connected with the outer wire organizer; the second electrical connecting structure comprises a second contact portion, and the second contact portion comprises a second contact terminal set; wherein the second contact terminal set each comprises a signal terminal, a positive terminal and a negative terminal.

* * * * *